(12) United States Patent
Schweiter, Jr.

(10) Patent No.: US 9,582,086 B2
(45) Date of Patent: Feb. 28, 2017

(54) COMPUTER USER INTERFACE SUPPORT APPARATUS

(71) Applicant: John Edward Schweiter, Jr., Pasco, WA (US)

(72) Inventor: John Edward Schweiter, Jr., Pasco, WA (US)

( * ) Notice: Subject to any disclaimer, the term of this patent is extended or adjusted under 35 U.S.C. 154(b) by 0 days.

(21) Appl. No.: 14/252,964

(22) Filed: Apr. 15, 2014

(65) Prior Publication Data

US 2014/0331900 A1 Nov. 13, 2014

Related U.S. Application Data

(60) Provisional application No. 61/820,180, filed on May 7, 2013, provisional application No. 61/826,007, filed on May 21, 2013.

(51) Int. Cl.
*A47B 23/00* (2006.01)
*A47B 37/00* (2006.01)
*G06F 3/039* (2013.01)

(52) U.S. Cl.
CPC .................................. *G06F 3/039* (2013.01)

(58) Field of Classification Search
CPC .............................. A47B 21/04; A47B 23/002
USPC .................................................. 108/50.02, 43
See application file for complete search history.

(56) References Cited

U.S. PATENT DOCUMENTS

| | | | | |
|---|---|---|---|---|
| 4,648,603 A | * | 3/1987 | Hayford, Jr. | A63F 13/02 108/43 |
| 4,700,634 A | * | 10/1987 | Mills et al. | 108/43 |
| 5,022,170 A | * | 6/1991 | House | B43L 1/00 281/45 |
| 5,433,407 A | * | 7/1995 | Rice | 248/118.1 |
| 5,542,637 A | * | 8/1996 | Schriner | G06F 3/0395 206/576 |
| 5,893,540 A | * | 4/1999 | Scott | 248/118 |
| 5,957,595 A | * | 9/1999 | Chen | 400/472 |
| 6,041,715 A | * | 3/2000 | Jarke et al. | 108/43 |
| 6,185,964 B1 | * | 2/2001 | Addiego | G06F 3/039 248/551 |
| 6,374,751 B1 | * | 4/2002 | With | A47B 23/002 100/90 |

(Continued)

FOREIGN PATENT DOCUMENTS

JP 410320111 * 12/1998

*Primary Examiner* — Daniel J Troy
*Assistant Examiner* — Timothy M Ayres
(74) *Attorney, Agent, or Firm* — Garrett James O'Sullivan; Eric Brandon Lovell

(57) ABSTRACT

A user interface support apparatus for securing wireless computer peripherals (WCP) such as a keyboard and a pointing device is disclosed. The user interface support apparatus comprises a board comprising (i) a keyboard area on a top surface of the board and configured to secure a keyboard and (ii) a pointing device area on a top surface of the board. The user interface support apparatus also comprises a pointing device support structure secured to the pointing device area of the board and operable in a first mode or a second mode. In the first mode, the pointing device support structure in conjunction with the pointing device area of the board stores the pointing device. In the second mode, the pointing device support structure provides a planar surface on which to operate the pointing device.

9 Claims, 4 Drawing Sheets

(56) References Cited

U.S. PATENT DOCUMENTS

| | | | |
|---|---|---|---|
| 6,513,777 B1* | 2/2003 | Fabio | G06F 3/0395 248/118 |
| 6,525,268 B1* | 2/2003 | Sellers | A47C 31/008 174/561 |
| 6,549,189 B1* | 4/2003 | Zarek | 345/168 |
| 6,644,605 B1* | 11/2003 | Tyner | 248/118.1 |
| 6,903,924 B1* | 6/2005 | Tyner | 361/679.08 |
| 6,989,814 B1* | 1/2006 | Mattson | G06F 3/0395 248/346.01 |
| 7,106,302 B2* | 9/2006 | Chen | G06F 1/3203 345/158 |
| 7,175,536 B1* | 2/2007 | Tortola | A63B 69/0002 473/140 |
| 7,249,747 B2* | 7/2007 | Marceau et al. | 248/346.04 |
| 7,293,751 B2* | 11/2007 | Eriksson | 248/346.01 |
| D609,027 S * | 2/2010 | Jennings | D6/406.5 |
| 8,327,774 B1* | 12/2012 | Rivera | 108/44 |
| 8,635,959 B1* | 1/2014 | Silknitter | 108/43 |
| 2003/0019402 A1* | 1/2003 | Cogliandro | 108/50.11 |
| 2003/0230220 A1* | 12/2003 | Evans | A47C 7/70 108/43 |
| 2004/0108433 A1* | 6/2004 | Gunsch | 248/346.01 |
| 2004/0261668 A1* | 12/2004 | Jarke et al. | 108/43 |
| 2005/0231478 A1* | 10/2005 | Keck | G06F 3/039 345/163 |
| 2006/0131190 A1* | 6/2006 | Weaver | G06F 3/039 206/305 |
| 2008/0164157 A1* | 7/2008 | Sween | A45C 9/00 206/216 |
| 2008/0282940 A1* | 11/2008 | Marion | A47B 23/00 108/43 |

\* cited by examiner

COMPUTER USER INTERFACE SUPPORT APPARATUS

CROSS-REFERENCE TO RELATED APPLICATION

This application claims priority under 35 U.S.C. §119(e) to U.S. Provisional Patent Application No. 61/820,180, filed on May 7, 2013, and U.S. Provisional Patent Application No. 61/826,007, filed on May 21, 2013, which are incorporated by reference herein in their entirety. This application also claims priority under 35 U.S.C. §119(a) to U.K. Patent Application No. 1310184.5, filed on Jun. 7, 2013, and U.K. Patent Application No. 1317048.5, filed on Sep. 25, 2013, which are incorporated by reference herein in their entirety.

BACKGROUND

The present disclosure relates to an interface portable lapdesk for organizing and securing of wireless computer peripherals.

With recent developments of display devices and network devices, a computer can be connected to a television (TV), allowing any tasks or operations performed online through the Internet to be viewed on a large TV screen. Additionally, an Internet TV is integrated with an internal computer and/or an internal wireless transceiver to connect to the Internet. The Internet TV allows for a user to view online contents on the large TV screen. The capability of the computer to connect to the TV and the Internet enables the user to experience the Internet TV. For example, the user can browse the Internet and view online contents from a third party hosting site in a living room while lying on a sofa.

For the user to fully utilize and experience the Internet TV, it is useful to have wireless computer peripherals (WCPs) interfacing with the Internet TV. The WCPs are wireless input and output devices for the computer such as a wireless keyboard, mouse, track ball, joy stick, camera, microphone, printer, speaker, and etc. By using the WCPs, the user can conveniently perform operations on the Internet TV without wires that limit the user's mobility and cause inconvenience to the user.

SUMMARY

Embodiments relate to a user interface support apparatus that provides a stable platform to operate one or more user interfaces communicating with a computer. The user interface support apparatus is operable in a first mode or a second mode. In the first mode, the pointing device support structure in conjunction with the pointing device area of the board stores the pointing device. In the second mode, the pointing device support structure provides a planar surface on which to operate the pointing device. The user interface support apparatus includes a board. The board includes a keyboard area on a top surface of the board and secures a keyboard. The board also includes a pointing device area on the top surface of the board. The user interface support apparatus also includes a pointing device support structure secured to the pointing device area of the board.

In one embodiment, the pointing device support structure and the pointing device area enclose the pointing device to store the pointing device. At least a portion of the pointing device support structure may be detachable from the pointing device area.

In one embodiment, a portion of the pointing device support structure is permanently secured to the pointing device area.

In one embodiment, the user interface support apparatus includes a pointing device support structure securing mechanism. The pointing device support structure securing mechanism includes a first pointing device support structure securing element and a second pointing device support structure securing element. The first pointing device support structure securing element is on the pointing device support structure. The second pointing device support structure securing element is on the pointing device area. The pointing device area secures the pointing device support structure via the pointing device support structure securing mechanism.

In one embodiment, the first pointing device support structure securing element is provided at a corner of the pointing device support structure. The first pointing device support structure securing element may be provided on a perimeter of the pointing device support structure.

In one embodiment, the user interface support apparatus includes a first keyboard securing element on the keyboard area for coupling to a second keyboard securing element on the keyboard.

In one embodiment, the user interface support apparatus includes a spacer. One end of the spacer is coupled to the keyboard area, and another end of the spacer is coupled to the keyboard. The spacer may be detachable from the keyboard and the keyboard area. Height of the spacer may be adjustable.

In one embodiment, the user interface support apparatus may include a protruding member on the board. The user interface support apparatus may include a slot on the board. The user interface support apparatus may include an open area on the board. The open area may include materials with friction. The protruding member, slot, and/or the open area prevent items from slipping.

In one embodiment, the user interface support apparatus includes a pad on a bottom surface of the board. The bottom surface of the board faces away from the top surface of the board. The pad may be detachable.

DETAILED DESCRIPTION OF EMBODIMENTS

Figure 1:
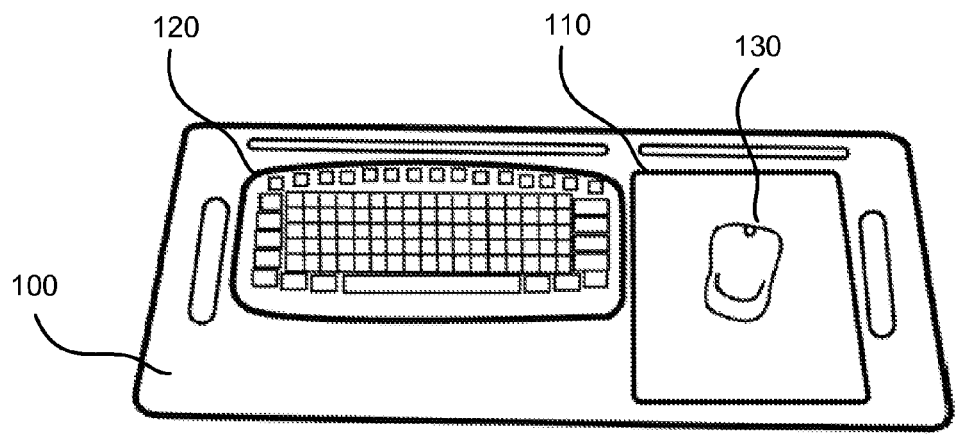
FIG. 1 is a perspective view of a user interface apparatus in an operation mode, according to one embodiment.

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments.

In the drawings, like reference numerals in the drawings denote like elements. The shape, size and regions, and the like, of the drawing may be exaggerated for clarity.

Embodiments relate to a user interface support apparatus that has a support structure for operating a wireless computer peripheral (WCP) and for storing one or more WCPs. The user interface support apparatus can be operated in one of two modes: an operation mode and a storage mode. In the operation mode, the user interface support apparatus provides a support structure on which to operate the WCP. In the storage mode, the user interface support apparatus provides a securing mechanism to enclose the WCP.

The WCP herein refers to wireless input devices to control computers and output devices operated by the computers. The WCP includes, but is not limited to, a wireless keyboard (generally referred to herein as a keyboard), pointing device, camera, microphone, printer, speaker, and etc. The pointing device herein refers to a wireless input device for a user to input spatial operations to a computer. The spatial operations include, but are not limited to, pointing, clicking, and dragging operations to control a computer. For example, the pointing device can be a wireless mouse, a track ball, a track point, or a joy stick.

The pointing device support structure herein refers to an apparatus providing a surface on which to operate the WCP in the operation mode and also securing the WCP in the storage mode. For example, the pointing device support structure may be a mouse pad with flexible materials.

EXAMPLE USER INTERFACE SUPPORT APPARATUS

A user interface support apparatus provides a portable medium to enable a user to control a computer connected to a TV in a living room. Because the WCP are intended to be used on a desk in an office, it is difficult to operate the WCP in a place where a desk is not available. Embodiments enable the user to operate the WCP in various places without a desk (e.g., in a living room or a bedroom).

In addition to providing a portable space, the user interface support apparatus securely holds the WCP in a pocket. In some embodiments, the pocket secures the WCP omnidirectionally (i.e., in all direction). The pocket is formed by the pointing device support structure in the storage mode. The pocket formed by the pointing device support structure provides a flexible securing mechanism that can repeatedly secure or remove the WCP.

FIG. 1 illustrates a user interface support apparatus 101A in an operation mode. The user interface support apparatus 101A can be carried around and used at a place remote from a computer. In the operation mode, the user interface support apparatus 101A provides a surface for operating the WCP. The user interface support apparatus 101A may include, among other components, a board 100, and a pointing device support structure 110.

In the embodiment of FIG. 1, the WCP includes a keyboard 120 and a pointing device 130 to interface with a computer connected to a TV (not shown) or a computer embedded in an Internet TV (not shown). The keyboard 120 is attached to a keyboard area (which is not shown in FIG. 1 since the keyboard area is hidden underneath the keyboard 120) on a top surface of the board 100 using a mechanism described below in detail with reference to FIGS. 3A and 3B. The keyboard 120 may be purchased separately and be secured to the board 100.

The pointing device support structure 110 is used as a generally planar surface on which to operate the pointing device 130. In addition, the pointing device support structure 110 is used as a part of a storage mechanism to secure the pointing device 130 when not in use. The pointing device support structure 110 is attached to a pointing device area (which is not shown in FIG. 1 since the pointing device area is hidden underneath the pointing device support structure 110). The pointing device support structure 110 is on the top surface of the board 100 as a flat padding with a generally planar surface with low friction. For example, the pointing device support structure 110 may be a mouse pad secured to the board 100.

Although the keyboard 120 and the pointing device 130 are illustrated as the only WCP in FIG. 1, additional devices such as wireless motion sensors, speakers, and etc., can also be secured to the user interface support apparatus 101A to afford enhanced functionality to the user interface support apparatus 101A.

In an alternative embodiment, the board 100 may be of appropriate materials with a smooth surface, so that the pointing device 130 can be used directly on the board 100, without need for the pointing device support structure 110.

Figure 2:
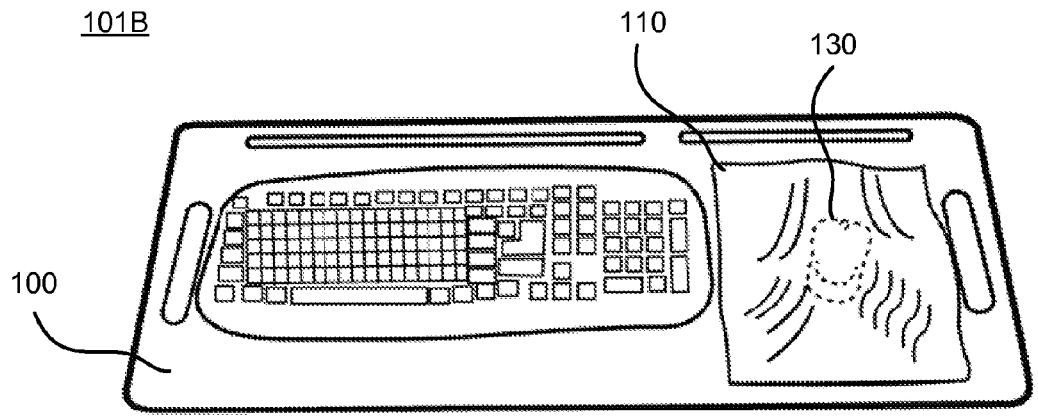
FIG. 2 is a perspective view of the user interface support apparatus in a storage mode, according to one embodiment.

FIG. 2 illustrates the user interface support apparatus 101B in a storage mode, according to one embodiment. A portion of the pointing device support structure 110 secured to the board 100 is partially or wholly detachable, and hence, the pointing device support structure 110 and the pointing device area (not shown) of the board 100 may form a pocket. The opening (i.e., a mouth) of the pocket formed by detaching the pointing device support structure 110 from the board 100 enables the user to insert the pointing device 130 into the pocket. Alternatively, at least a portion of the pointing device support structure 110 is permanently secured to the board 100, and an unattached portion of the pointing device support structure 110 may be stretched to insert the pointing device 130 into the pocket.

After the pointing device 130 is inserted, the detached portion of the pointing device support structure 110 can be re-attached to the pointing device area, thus enclosing the pointing device 130 omnidirectionally. The pointing device support structure 110 is preferably of highly flexible or elastic materials, so that it can flexibly cover the pointing device 130 and press the pointing device 130 against the board 100 and thereby secure the pointing device 130 to the board 100.

Figure 3A:
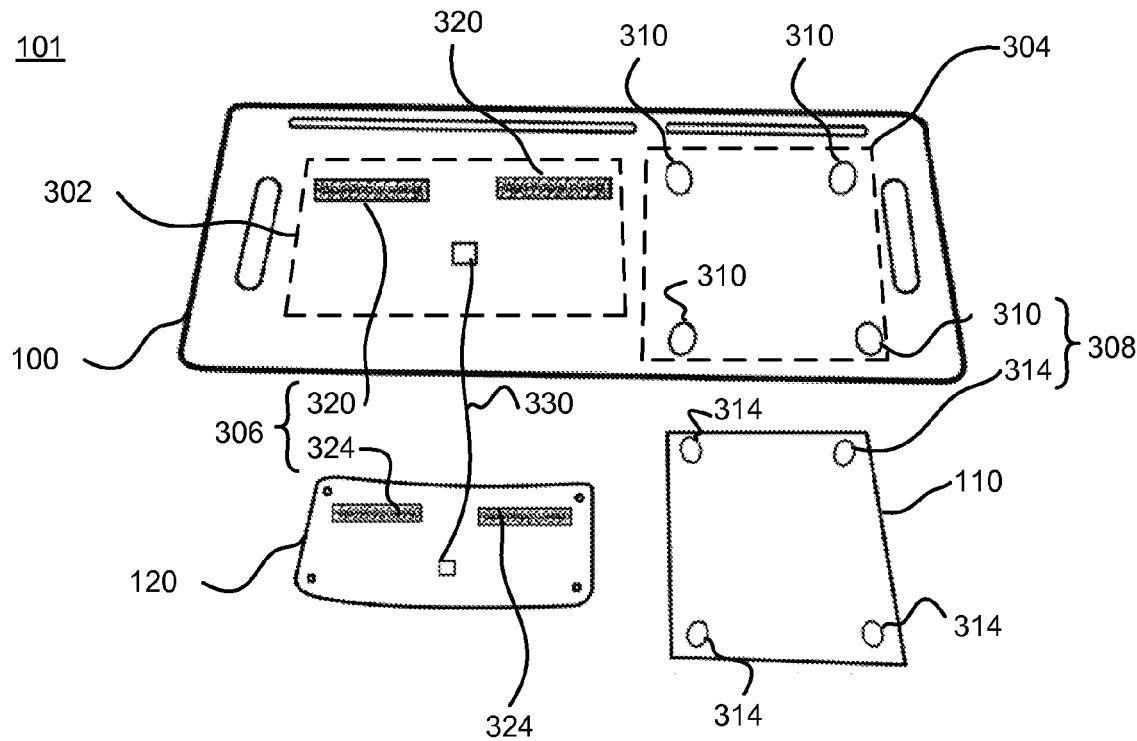
FIGS. 3A and 3B are perspective views of a wireless computer peripheral (WCP) removed from the user interface support apparatus, according to embodiments.

FIG. 3A illustrates the keyboard 120 and the pointing device support structure 110 removed from the user interface support apparatus 101, according to one embodiment. Because the pointing device support structure 110 is removed from the board 100, the keyboard area 302 and the pointing device area 304 are now shown in FIG. 3A.

The keyboard area 302 secures the keyboard 120. The pointing device area 304 secures the pointing device support structure 110 on the board 100. In FIG. 3A, bottom surfaces of the keyboard 120 and the pointing device support structure 110 are shown to better illustrate the securing mechanisms.

A keyboard securing mechanism 306 is used to attach the keyboard 120 to the keyboard area 302 of the board 100. The keyboard securing mechanism 306 includes at least one keyboard securing element 324 placed on a bottom surface of the keyboard 120 and at least one associated keyboard securing element 320 placed on the keyboard area 302 of the board 100. In one embodiment, the keyboard securing mechanism 306 may be hook and loop type fasteners. Alternatively, the keyboard securing mechanism 306 and the pointing device support structure securing mechanism 308 may be, but not limited to, snap hook, zip, pressure button, flexible cord, magnetic coupler, or adhesive material type fasteners.

The keyboard securing element 324 may be implemented on any surface of the keyboard 120. For example, the keyboard securing element 324 is implemented on a top surface of the keyboard 120, where the top surface of the keyboard 120 faces away from the bottom surface of the keyboard 120. In case where the keyboard securing element 324 is implemented on the top surface of the keyboard 120, the keyboard securing element 324 may be placed where keys are not present on the top surface of the keyboard 120. Alternatively or additionally, the keyboard securing element 324 may be implemented on any side of the keyboard 120, where one end of any side of the keyboard 120 is connected to the bottom surface of the keyboard 120 and another end of any side of the keyboard 120 is connected to the top surface of the keyboard 120.

Although not necessary, an additional keyboard securing mechanism 330 may be implemented to provide further secure holding of the keyboard 120. The additional keyboard securing mechanism 330 can be implemented with a similar securing mechanism with respect to the keyboard securing mechanism 306, and therefore, the detailed description thereof is omitted herein for the sake of brevity. As the keyboard securing mechanism 306, the additional keyboard securing mechanism 330 may be implemented on at least any one of the bottom surface, top surface or any side of the keyboard 120.

In one embodiment, the keyboard area 302 includes a cavity on the board 100 that (bespokely) fits a matching keyboard 120. The matching keyboard 120 is in a particular size and shape to be secured on the keyboard area 302. The keyboard securing mechanism 306 may include a keyboard securing element 320 on the keyboard area 302. The keyboard securing element may be a clip to secure the matching keyboard 120 in place on the keyboard area 302 on the board 100. Alternatively, the keyboard securing element 320 may be flanges that are particular to the matching keyboard 120, and mate to hold the matching keyboard 120 in place.

A pointing device support structure securing mechanism 308 attaches the pointing device support structure 110 to the pointing device area 304 of the board 100. The pointing device support structure securing mechanism 308 can be implemented with similar securing mechanism with respect to the keyboard securing mechanism 306, and therefore, the detailed description thereof is omitted herein for the sake of brevity. As in the keyboard securing mechanism 306, the pointing device support structure securing mechanism 308 includes at least one pointing device support structure securing element 314 placed on a bottom surface of the pointing device support structure 110 and at least one associated pointing device support structure securing element 310 placed on the pointing device area 304. The bottom surface of the pointing device support structure 110 is facing away from a top surface of the pointing device support structure 110 on which to place the pointing device 130 in the operation mode.

Figure 3B:
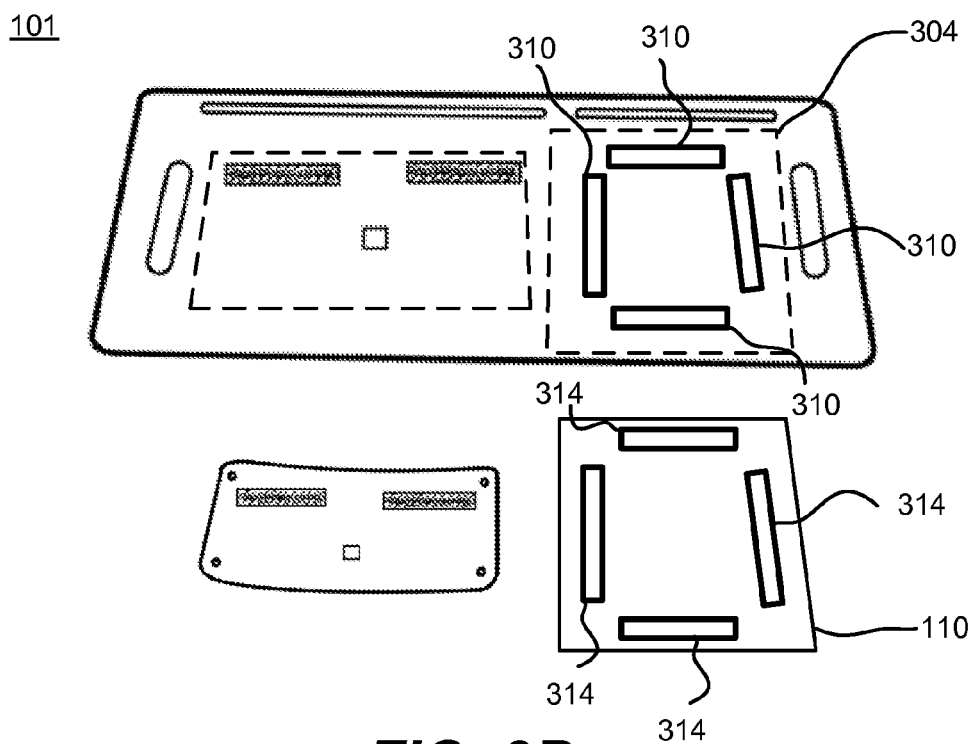

In FIG. 3A, four pointing device support structure securing elements 314 are placed on each corner of the pointing device support structure 110. Alternatively, the pointing device support structure securing elements 314 may be placed along a perimeter of the pointing device support structure 110 as illustrated in FIG. 3B. The pointing device support structure securing element 314 may be implemented on any surface of the pointing device support structure 110 to ensure secure holding of the pointing device 130. For example, the pointing device support structure securing element 314 is implemented on the bottom surface of the pointing device support structure 110.

Alternatively, the pointing device support structure securing element 314 is implemented on the top surface of the pointing device support structure 110. In such a case, a portion of the pointing device support structure 110 can be folded or rolled to enable the pointing device support structure securing element 314 to contact the associated pointing device support structure securing element 310. Alternatively, the pointing device support structure securing element 314 and/or the associated pointing device support structure securing element 310 can extend to contact with each other. The associated pointing device support structure securing elements 310 are placed on the pointing device area 304, such that each pointing device support structure securing element 314 and the associated pointing device support structure securing element 310 can contact.

Implementing the pointing device support structure securing elements 314 on each corner or a perimeter of the pointing device support structure 110 allows easy attaching and detaching of the pointing device support structure 110 from the pointing device area 304. This implementation also allows securing the pointing device 130 in the storage mode by utilizing elastic property of the pointing device support structure 110 that causes the pointing device support structure 110 to press the pointing device 130 against the board 100. Although the pointing device support structure 110 in FIG. 3A has a rectangular shape, the pointing device support structure 110 may have any arbitrary shape. For example, the pointing device support structure 110 may have, but not limited to, a circular, pentagonal, hexagonal, or oval shape. The number, shape, and placement of the pointing device support structure securing mechanism 308 may be adjusted according to the shape of the pointing device support structure 110.

In one embodiment, the pointing device support structure securing mechanism 308 has four pointing device support structure securing elements 314 on the corners of the bottom surface of the pointing device support structure 110, and four associated pointing device support structure securing elements 310 at corresponding locations on the pointing device area 304, as shown in FIG. 3A.

Alternatively, the pointing device support structure securing element 314 may run along a perimeter of the pointing device support structure 110 as shown in FIG. 3B. The pointing device support structure securing element 314 may run along the whole or part of the perimeter of the pointing device support structure 110, and seal the pointing device support structure 110 and the pointing device area 304 in the storage mode.

Figure 4:
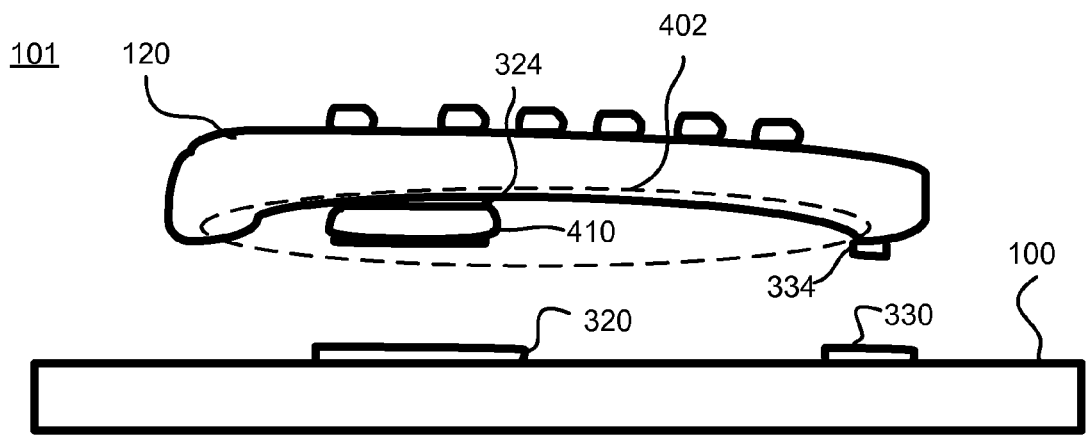
FIG. 4 is a side view of the keyboard and the user interface support apparatus, illustrating a spacer to secure the keyboard with a cavitous form factor, according to one embodiment.

FIG. 4 illustrates a side view of the keyboard 120 and the board 100 of the user interface support apparatus 101 with a spacer 410 to secure the keyboard 120 of a cavitous form factor, according to one embodiment. Cavitous form factors are not unusual in keyboards 120. As shown in FIG. 4, the keyboard 120 has a cavitous portion 402. In such a case, the keyboard securing element 324 on the keyboard 120 and the associated keyboard securing element 320 on the board 100 may not come into contact. Thus, in the embodiment of FIG. 4, a spacer 410 is provided between the keyboard 120 and the keyboard area 302 as a medium for connecting the keyboard 120 and the keyboard area 302, thereby securely fixing the keyboard 120 to the keyboard area 302. The spacer 410 facilitates secure attachment of the keyboard 120 with the cavitous portion 402.

The spacer 410 may simply be a length or mass of resilient sponge, or the like. The spacer 410 may include a surface (which may itself be hook and loop type fastener) for attaching to, for the present example, the keyboard securing element 324, and an opposing surface for attaching to the associated keyboard securing element 320. Thus, the keyboard 120 with the cavitous form factor may be secured to the keyboard area 302 of the keyboard 120 via the spacer 410. The height of the spacer 410 may be adjusted accordingly.

Figure 5A:
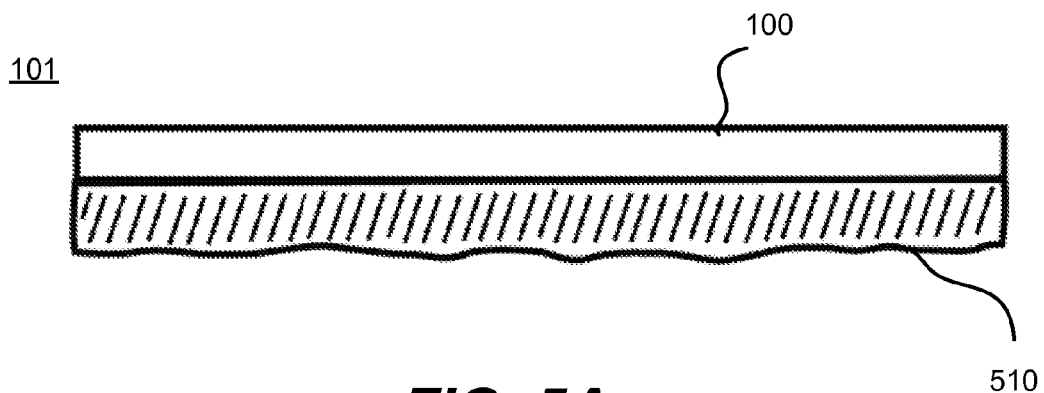
FIGS. 5A and 5B are cross-sectional views of the user interface support apparatus with a pad attached to a bottom surface of the user interface support apparatus, according to embodiments.
Figure 5B:
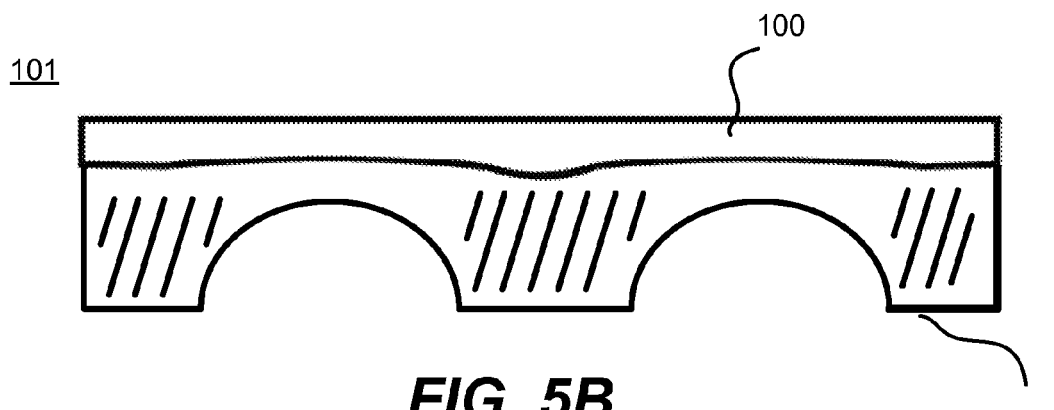

FIGS. 5A and 5B are cross-sectional views of the user interface support apparatus 101 with a pad attached to a bottom surface of the board 100, according to one embodiment. The bottom surface of the board 100 faces downward away from the top surface of the board 100. In FIG. 5A, a cushion-type pad 510 is attached to the bottom surface of the board 100 for the user's comfort when in use. The pad 510 may be permanently attached to the board 100 or be removable for replacement with another pad 510.

FIG. 5B is a diagram illustrating the user interface support apparatus 101 with a pad 520 attached to the bottom surface of the board 100, according to one embodiment. The pad 520 of FIG. 5B includes two concave curves for comfortable fitting over the user's legs. Alternatively, a bottom surface of the board 100 may be shaped specifically without the pad 510 or 520 for use on the user's lap. Instead, the bottom surface of the board 100 may be shaped with two concave curves, so that the board 100 fits comfortably over the user's legs in a manner similarly to how a chair or stool is often shaped for the user's posterior.

Figure 6:
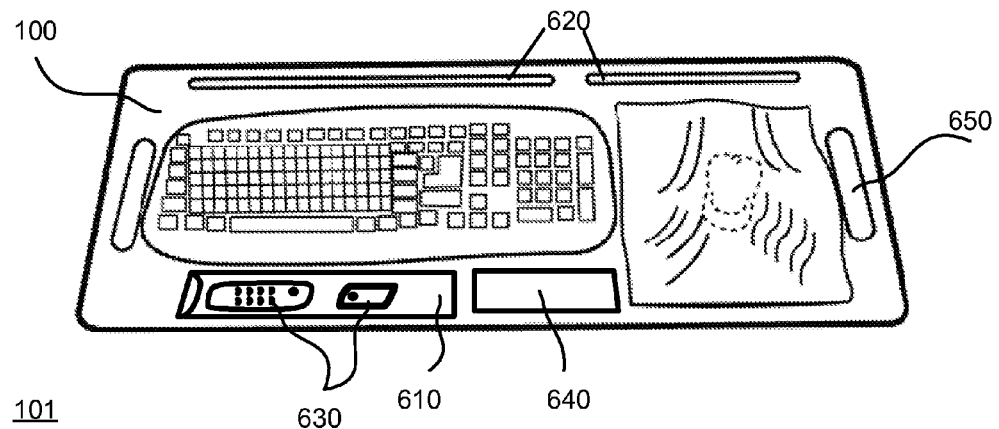
FIG. 6 is a perspective view of the user interface support apparatus with a slot, protruding member, and open area to place items such as remote controllers, cell phones, or other peripherals, according to one embodiment.

FIG. 6 is a perspective view of the user interface support apparatus 101 with a slot 610 and a protruding member 620 according to one embodiment. The slot 610 is used for placement and safekeeping of objects 630 to prevent them from slipping during the operational use of the user interface support apparatus 101. The objects 630 that may be placed in the slot 610 may include, for example, remote controllers, cell phones, pens, wallets and key chains. The protruding member 620 prevents the objects 630 from sliding down the user interface support apparatus 101, and can be used for placement and safekeeping of objects 630 as well.

The open area 640 can be used to place objects 630. The open area 640 may be implemented with materials having high friction that enable the open area 640 to prevent objects 630 from slipping. The slot 610, protruding member 620, and open area 640 may be provided in any location(s) about the board 100, and there may be a plurality of slots 610, protruding members 620, and open areas 640 on the board 100 for placement of other objects 630.

In addition, the user interface support apparatus 101 may be formed with a handle 650 on a lateral end of the board 100. The handle 650 facilitates picking up the board 100, when it is placed in the storage mode propped against a wall or laid on a flat surface. The handle 650 may be in the form of an aperture, or recesses that are shaped specifically for the user to hold at the lateral ends of the board 100. The handle 650 may be placed in any position on the board 100, and there may be a plurality of handles 650 for allowing better grip to the user.

Figure 7:
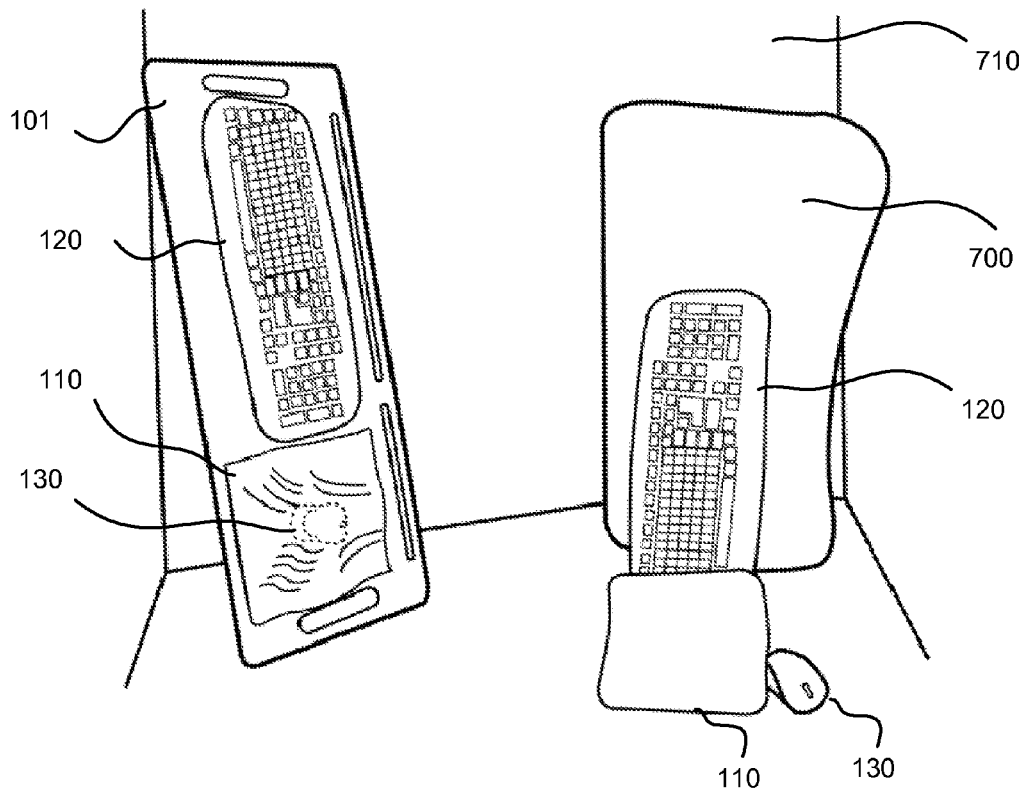
FIG. 7 is a diagram comparing user interface support apparatus in the storage mode according to one embodiment and a conventional lapdesk placed against a surface.

FIG. 7 is a comparison view of the user interface support apparatus 101 in the storage mode against a conventional lapdesk 700. In FIG. 7, the user interface support apparatus 101 is shown in the storage mode when propped up against a wall 710, in comparison to the conventional lapdesk 700.

The TV room environment is different to a standard computer room/office environment. It may be desirable for the user interface support apparatus 101 to be put aside, especially upright, for use at a later point, to be transported to an alternate address, or to be stored away.

The conventional lapdesk 700 do not have the features for securely storing of the WCP including the keyboard 120 and pointing device 130 omnidirectionally. Thus it can be seen that, stored propped up upright against the wall 710, the WCP and other elements, have all fallen off the conventional lapdesk 700. However, with the user interface support apparatus 101, the keyboard 120 and the pointing device 130 remain omnidirectionally secured to the board 100.

The advantages of the interface support apparatus include, among others, (i) providing a portable operating space, (ii) securing the WCP omnidirectionally, and (iii) facilitating the Internet TV usage.

While particular embodiments and applications have been illustrated and described herein, it is to be understood that the invention is not limited to the precise construction and components disclosed herein and that various modifications, changes and variations may be made in the arrangement, operation and details of the method and apparatus disclosed herein without departing from the spirit and scope of the present disclosure.

I claim:
1. A user interface support apparatus comprising:
   a. a board comprising:
      1. a first handle extending through a first end of the board;
      2. a second handle extending through a second end of the board, the second handle being oriented in parallel with the first handle and a width of the board, the width of the board being shorter than a length of the board;
      3. a keyboard area comprising one or more securing elements on a top surface of the board; and
      4. a pointing device area comprising a plurality of securing elements on the top surface of the board, wherein the keyboard area is positioned between and adjacent to the first handle and the pointing device area, and the pointing device area is positioned between and adjacent to the second handle and the keyboard area, wherein a length of the keyboard area is greater than a length of the pointing device area, and wherein the top surface of the board is planar between and including the keyboard area and the pointing device area;
   b. a computer keyboard comprising one or more securing elements that matingly engage the one or more keyboard area securing elements to releasably couple the keyboard to the keyboard area; and
   c. an elastic pointing device support structure comprising a plurality of securing elements that matingly engage the plurality of pointing device area securing elements to releasably couple the pointing device support structure to the pointing device area, creating a pocket between the top surface of the board and a bottom surface of the pointing device support structure, wherein a top surface of the pointing device support structure provides a planar surface on which to laterally move an electronic mouse, wherein lateral movement of the mouse on the pointing device support structure controls movement of a cursor on a connected computer screen, wherein when the mouse is not in opera- tion, the pointing device support structure stretches over the mouse to omnidirectionally secure the mouse within the pocket.

2. The user interface support apparatus of claim 1, wherein at least a portion of the pointing device support structure is detachable from the pointing device area.

3. The user interface support apparatus of claim 2, wherein the pointing device support structure securing elements are attached to a plurality of corners of the pointing device support structure.

4. The user interface support apparatus of claim 2, wherein the pointing device support structure securing elements are attached along a perimeter of the pointing device support structure.

5. The user interface support apparatus of claim 3, wherein the pointing device support structure securing mechanism is at least one of a hook and loop, snap hook, button, and adhesive type fastener.

6. The user interface support apparatus of claim 1, wherein the one or more keyboard area securing elements and the one or more keyboard securing elements is at least one of a hook and loop, snap hook, button, clip, flange, and adhesive type fastener.

7. The user interface support apparatus of claim 1, further comprising a spacer comprising a first securing element on a top surface of the spacer and second securing element on a bottom surface of the spacer, wherein the first securing element matingly engages at least one of the one or more keyboard securing elements and the second securing element matingly engages at least one of the one or more keyboard area securing elements to removably couple the keyboard to the keyboard area, wherein a height of the spacer is adjustable.

8. The user interface support apparatus of claim 7, wherein the board further comprises:
   a. one or more slots extending into the top surface of the board; and
   b. one or more protruding members protruding outward from the top surface of the board.

9. The user interface support apparatus of claim 8, further comprising a pad attached to a bottom surface of the board, wherein at least a length of the pad is equal to the length of the board.

* * * * *